United States Patent
Bronstein et al.

(10) Patent No.: US 9,635,345 B2
(45) Date of Patent: Apr. 25, 2017

(54) METHOD AND SYSTEM FOR ACQUISITION, REPRESENTATION, COMPRESSION, AND TRANSMISSION OF THREE-DIMENSIONAL DATA

(75) Inventors: Michael Bronstein, Lugano (CH); Ron Kimmel, Haifa (IL); Sagi Ben Moshe, Kiryat Bialik (IL)

(73) Assignee: Intel Corporation, Santa Clara, CA (US)

( * ) Notice: Subject to any disclaimer, the term of this patent is extended or adjusted under 35 U.S.C. 154(b) by 753 days.

(21) Appl. No.: 13/994,197

(22) PCT Filed: Jan. 24, 2012

(86) PCT No.: PCT/IB2012/050335
§ 371 (c)(1),
(2), (4) Date: Aug. 12, 2013

(87) PCT Pub. No.: WO2012/101582
PCT Pub. Date: Aug. 2, 2012

(65) Prior Publication Data
US 2013/0307931 A1    Nov. 21, 2013

Related U.S. Application Data

(60) Provisional application No. 61/435,383, filed on Jan. 24, 2011.

(51) Int. Cl.
H04N 13/00 (2006.01)
H04N 13/02 (2006.01)
G01B 11/25 (2006.01)
G06T 1/00 (2006.01)

(52) U.S. Cl.
CPC .......... H04N 13/02 (2013.01); G01B 11/2504 (2013.01); G01B 11/2513 (2013.01); G06T 1/0007 (2013.01); H04N 13/0048 (2013.01); H04N 13/0207 (2013.01); H04N 13/0246 (2013.01); H04N 13/0253 (2013.01); G06T 2200/04 (2013.01)

(58) Field of Classification Search
CPC ........... H04N 13/0207; H04N 13/0246; H04N 13/0253; G01B 11/2504
USPC ............. 348/51, 42, 43, 135, 136, 139, 140; 382/154
See application file for complete search history.

(56) References Cited

U.S. PATENT DOCUMENTS

2004/0032980 A1* 2/2004 Harman ................ G06T 7/0022
382/154
2007/0229850 A1 10/2007 Herber

OTHER PUBLICATIONS

PCT International Search Report and Written Opinion issued in corresponding PCT/IB2012/050335 dated Jun. 12, 2012 (16 pages).

(Continued)

Primary Examiner — Michael Lee
Assistant Examiner — Jean W Desir
(74) Attorney, Agent, or Firm — Trop Pruner & Hu, P.C.

(57) ABSTRACT

A method for acquiring three dimensional coded light data, comprising receiving coded light data through a camera; and converting said received coded light data to representative data, said representative data being reduced in an amount in comparison to said received coded light data, wherein said received coded light data can be reconstructed from said representative data.

22 Claims, 7 Drawing Sheets

(56) References Cited

OTHER PUBLICATIONS

Merkle, P., et al., "Video Plus Depth Compression for Mobile 3D Services," 3DTV Conference: The True Vision-Capture, Transmission and Display of 3D Video, May 4, 2009, IEEE, Piscataway, NJ (4 pages).
Rubenstein, O., et al., "3D-Color Video Camera," 2009 IEEE 12th International Conference on Computer Vision Workshops, ICCV Workshops, Piscataway, NJ, Sep. 27-Oct. 4, 2009 (6 pages).
Salvi, J., et al., Pattern Codification Strategies in Structured Light Systems, Pattern Recognition, Elsevier, GB, vol. 37, No. 4, Apr. 1, 2004 (24 pages).
Smolic, A., et al., "Coding Algorithms for 3DTV—A Survey," IEEE Transactions on Circuits and Systems for Video Technology, IEEE Service Center, Piscataway, NJ., vol. 17, No. 11, Nov. 1, 2007 (16 pages).
Vieira, M., et al., "A Camera-Projector System for Real-Time 3D Video," Computer Vision and Pattern Recognition, 2005 IEEE Computer Society Conference on, IEEE Piscataway, NJ, Jun. 25, 2005 (8 pages).
EP office action dated Oct. 20, 2016 in corresponding EP application No. 12 716 073.7-1906 (8 pages).
CN office action dated Apr. 6, 2016 in corresponding CN application No. 201280014345.1 (9 pages).
CN office action dated Nov. 14, 2016 in corresponding CN application No. 201280014345.1 (7 pages).

\* cited by examiner

| Range image r(i,j) | Texture mapping coordinates u(i,j) | Texture mapping coordinates v(i,j) |

Figure 3

METHOD AND SYSTEM FOR ACQUISITION, REPRESENTATION, COMPRESSION, AND TRANSMISSION OF THREE-DIMENSIONAL DATA

BACKGROUND OF THE INVENTION

Various methods are known in the art for performing active triangulation using structured light, or more specifically, coded light.

Broadly speaking, coded light methods aim at acquiring the three dimensional geometric structure of an object of interest by means of projecting a sequence of light patterns. A typical system features a camera and a projector with non-collinear optical axes, in which the projector is capable of illuminating the object with a pre-defined sequence of light patterns, and the camera capable of capturing the image of the object illuminated with these patterns, as shown in background art FIG. 1 and as described in greater detail below. The patterns are designed to form a code that encodes the position of an illuminated point on the object in the projector system coordinate. In each pixel seen by the camera the projector coordinate is thus also available, which allows reconstructing the three dimensional position of a point by means of triangulation. Triangulation assumes the knowledge of the geometric relations between the camera and projector systems of coordinates, which is recovered once by means of calibration. The reconstruction produces for each pixel of the camera image the x,y,z world coordinates, which can be represented in the form of three matrices (referred to as a geometry image). Typically, 8-12 patterns are used for accurate geometry reconstruction (though fewer patterns are possible for various applications, like a single pattern geometry reconstruction apparatus). In order to capture video rate (30 frames per second), the camera used for geometry acquisition has to be able to acquire at least 240-360 frames per second. In some applications, it is desired that the projected patterns would not be seen by human, which can be achieved by using invisible (e.g. infra-red) spectrum projector and camera with a sensor sensitive to this spectrum.

If one wishes to also acquire the photometric properties of the object (texture), it is possible to project fully dark and fully bright patterns, which are captured by the camera. The resolution of the texture image is the same as the resolution of the camera used for geometry acquisition.

By repeatedly projecting light patterns on a moving object, capturing the respective images, and performing reconstruction, one can obtain a three dimensional video of the object. This video can be compressed, transmitted, and stored.

SUMMARY OF THE INVENTION

The background art does not teach or suggest a system and method for acquisition, representation, compression, transmission, and storage of three-dimensional data which is highly efficient and which permits for extensive compression of the data.

The present invention overcomes the above drawbacks of the background art by providing a system and method for acquisition of three-dimensional data which also permits efficient and extensive compression.

According to at least some embodiments, there is provided a system and method for acquiring three dimensional data, comprising projecting a sequence of coded light pattern, receiving images of illuminated scene through a camera; processing them to obtain binary data comprising bit-planes I1, . . . , Ib; performing reconstruction of the three-dimensional structure of the scene resulting in 3D coordinates x,y,z, and converting said 3D coordinates to representative data, said representative data being better structured for the use of standard compression algorithms and thus better compressible.

According to at least some embodiments, the reconstruction results in raw data represented as a geometric image, wherein in each pixel of the image, the three-dimensional coordinates of the pixel in space are stored. The geometric image can thus be considered as three arrays of the form $x(i,j)$, $y(i,j)$ and $z(i,j)$ where $i,j$ are pixel indices and $x,y,z$ are the three-dimensional coordinates.

Alternatively, the geometric image can be converted to a set of data related to the location of each pixel and the distance r distance from the camera origin $(x0,y0,z0)$ to the object. In a simple conversion process, this conversion is done according to the formula $$r(i,j)=\text{sqrt}\{(x(i,j)-x0)^2+(y(i,j)-y0)^2+(z(i,j)-z0)^2\}.$$

Texture information (either grayscale or color) may be captured by a separate camera, possibly with a different resolution from the camera used for three-dimensional data acquisition. The texture camera is calibrated with respect to camera used for three-dimensional data acquisition, such calibration providing for a mapping from the three-dimensional space coordinates $x,y,z$ to the texture camera two-dimensional system of coordinates $(u,v)$. As a result, for each pixel $i,j$ in the range image it is possible to obtain the corresponding pixel $i',j'$ in the texture image $T(u,v)$, which can be used for texture mapping. Texture mapping may optionally be performed according to the following simple process: for each range image pixel $i,j$, the texture coordinates $u(i,j),v(i,j)$ are computed. These coordinates may be at sub-pixel precision, and the texture is computed by interpolating the value of T at the point $u(i,j),v(i,j)$ from nearby pixels of T. This way, a texture image $T'(i,j)=T(u(i,j),v(i,j))$ in the range image coordinates is created and there is a one-to-one correspondence between a range pixel and its texture.

If the texture camera is in color, the color texture data may optionally be expressed as $RGB(u,v)$ and interpolated to $RGB'(i,j)=RGB(u(i,j),v(i,j))$ according to such mapping.

The above mapping permits much less data to be used for both the geometric image data and the texture data (or texture/color data), for example and without limitation for transmission, storage and so forth, without requiring the use of lossy methods of compression. Furthermore, such data may optionally be provided in a format (as a series of video frames for example) that is suitable for compression by known data compression methods. For example, a video frame may optionally be constructed that features the $r(i,j)$ matrix, such that the video data may optionally be provided as a sequence of images having this frame structure. Such a frame structure enables known video compression methods, such as H.264 (for example and without limitation) to compress the video data. Various compression methods are described in greater detail below.

Without wishing to be limited by a closed list, one challenge of 3D data compression consists in using existing compression algorithms (referred to as codecs or encoders/decoders, such as MPEG or H.264 standards for video compression) in combination with a special representation of the data to make it more compressible. In the case texture information is used, such a representation must allow a combined representation of geometric and texture information.

The present invention, in at least some embodiments, provides various methods to compress geometric and texture information for 3D data using standard video codecs. The system according to various embodiments of the present invention can be configured in several ways, resulting in asymmetric codec, where a tradeoff between the encoder-side and decoder-side complexity can be changed. For example, in a system where the camera side is implemented on a platform that has computational limitations and/or energy constraints, to reduce the computational complexity on the camera side, encoding can be applied to raw binary images, and reconstruction and texture mapping are performed at the client side after decoding. Alternatively, in a converse situation, all the reconstruction and texture mapping computations are made prior to encoding at the camera location.

BRIEF DESCRIPTION OF THE DRAWINGS

Background art

FIG. 3 shows an exemplary, illustrative video frame produced by the system of FIG. 2;

DESCRIPTION OF AT LEAST SOME EMBODIMENTS OF THE INVENTION

At least some embodiments of the present invention are now described with regard to the following illustrations and accompanying description, which are not intended to be limiting in any way.

Figure 1:
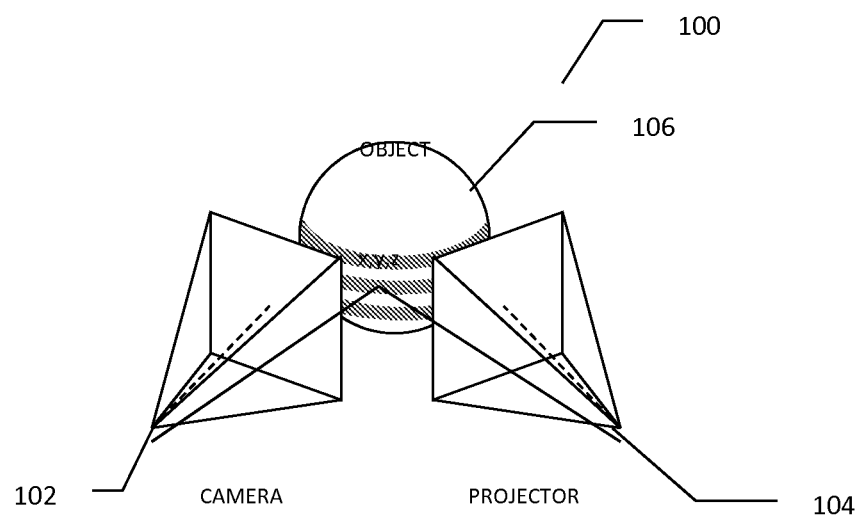
FIG. 1 shows a typical coded-light three-dimensional acquisition system.

Referring now to the drawings, as previously described, background art FIG. 1 shows a typical coded-light three-dimensional acquisition system 100, featuring a camera 102 for receiving coded light, a projector 104 for projecting coded light and an object 106. The lines on object 106 represent patterns of coded light being projected by projector 104. Camera 102 receives reflected coded light from object 106. Camera 102 may be considered to be equivalent to a geometry imager, which is the basic imaging device required for providing three dimensional images from coded light data. Thus, background art system 100 is able to provide basic three dimensional image data from coded light data.

Figure 2:
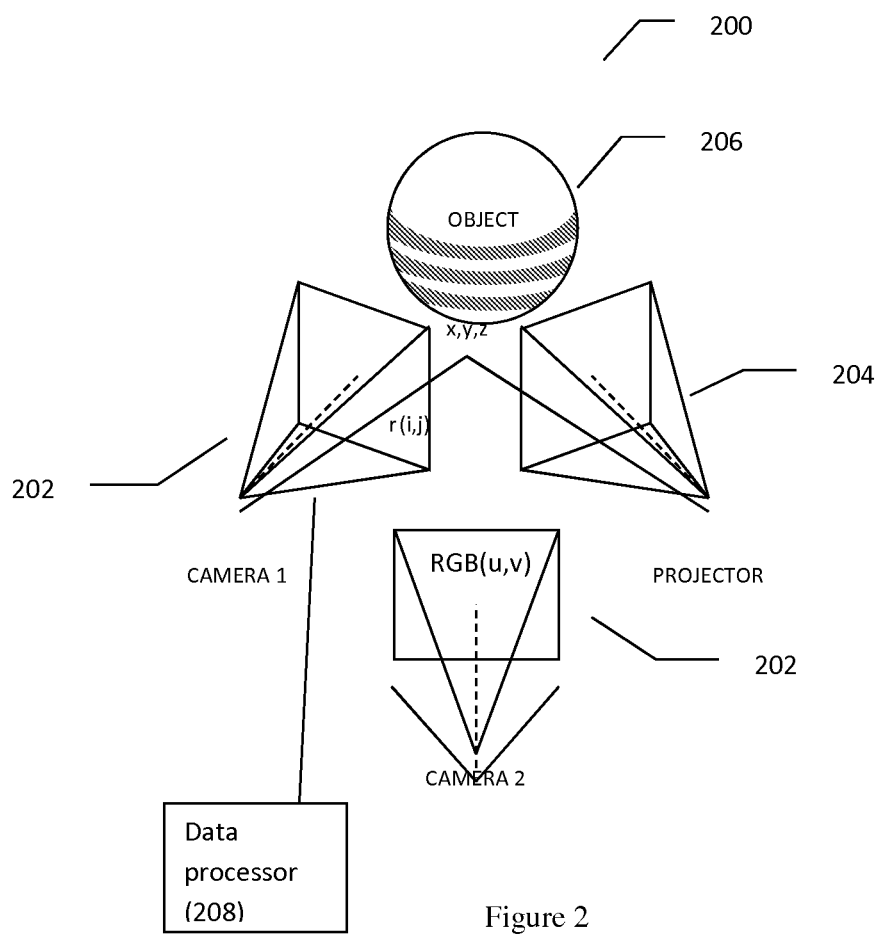
FIG. 2 shows an exemplary, illustrative system according to at least some embodiments according to the present invention.

FIG. 2 shows an exemplary, illustrative system according to at least some embodiments according to the present invention. As shown, a system 200 comprises a plurality of cameras, of which two cameras 202 are shown for the purpose of illustration only and without any intention of being limiting, a camera 1 202 and a camera 2 202. Camera 1 202 is the geometry imager or range camera, similar to the role of camera 102 in FIG. 1. Camera 2 202 is the texture/color data imager, which acquires texture and/or color image data.

The specific illustrated orientation of camera 1 202 relative to camera 2 202 is not required; however, preferably for maximizing the overlap between the geometry data and the texture and/or data, the texture-imager (camera 2 202) is placed so as to align as much as possible with the geometry imager (camera 1 202). Such an alignment is more preferably determined both in terms of the location of the focal points in space, as well as the focal length.

System 200 also features a projector 204 for projecting coded light onto an objector 206.

A data processor 208 reconstructs the distance r from the origin o of the camera system of coordinates (optical center of the camera) at each pixel acquired by cameras 1 and 2 202. Camera 1 202, as the geometric imager, acquires the coded light reflected from object 206. Data processor 208 does not reconstruct the x,y,z (Cartesian) world coordinates and hence the data acquired is reduced in amount. Optionally, system 200 does not feature data processor 208 as a separate entity and instead camera 1 202 performs the calculation.

Having the pixel location and the distance r, one can unambiguously recover the x,y,z coordinates at a location on the line of length r connecting the origin o and the pixel location. Among the advantages of such a representation is that instead of three matrices x,y,z of data, there is only one matrix $r(i,j)$ of data, from which the values of x,y,z are easily computable, off-line at any location. Matrix $r(i,j)$ can be stored, transmitted and reconverted to the values of x,y,z at any location and/or time, providing calibration parameters of the system.

For the purpose of description below, the texture data may optionally be described as a matrix $T(u,v)$ of data. If camera 2 202 is also capable of providing color data, then the combined texture/color data may optionally be described as $RGB(u,v)$.

Camera 2 202 is preferably calibrated with camera 1 202; more preferably, camera 2 202 has higher resolution and/or provides higher quality image data. For example and without wishing to be limited, camera 2 202 is optionally and preferably a high resolution RGB (red/green/blue) camera and may also optionally be used for obtaining color data. Optionally camera 2 202 does not need to operate at the same speed as camera 1 202, which is used for geometry reconstruction (i.e.—obtaining reflected coded light for reconstruction of the three dimensional structure of object 206. Using two cameras 202, one for texture with high spatial resolution and for color data, yet low frame rate, and one for geometry reconstruction, with high frame rate, provides excellent performance at a reasonable cost.

From calibration between camera 1 202 and camera 2 202, for each pixel in camera 1 202, the corresponding pixel in camera 2 202 can be determined. Hence, after such calibration, given the reconstructed geometry $r(i,j)$ data computed as described above, the texture $T(u,v)$ data captured by camera 2 202 can be mapped onto the geometry image data. That is, each texture point $T(u,v)$ (or $RGB(u,v)$ if camera 2 202 is capable of also providing color data) can be mapped via a texture mapping procedure into the (i,j) coordinates of the geometry image. Hence the coordinates (i,j) of the geometric image can in fact be used as the texture mapping coordinates, further reducing the amount of data required for storage, transmission and so forth.

Camera 1 202 may optionally be of significantly higher resolution and quality, and capture the image at a slower rate than the capture rate of camera 1 202. Spatial resolution of camera 2 202 may optionally be determined according to the requirements of the video display method. For example, the spatial resolution may optionally be sufficiently high to qualify according to the standards of HD (high definition) display, as well as HD interlaced or progressive scans, for which an important parameter is color. Color however is not required for camera 1 202, which is the geometry camera-imager. Camera 2 202 may optionally collect data in the visible spectrum of light, while camera 1 202 may optionally operate in IR (infra red) as synchronized with the projector 204.

Through providing such a system 200 and collecting data as described, standard video compression standards such as MPEG may optionally be used to compress the data, including both the geometric data and the color/texture data. For this purpose, the $r(i,j)$ matrix representing the geometry and the texture mapping coordinates $u(i,j),v(i,j)$ are combined into a single video frame as shown in FIG. 3. The stacking of the data in the frame may optionally be performed by packing along the rows, or alternatively by packing along the columns, of the two parameterization maps u and v.

FIG. 3 also demonstrates the transformation of the texture/color coordinates u,v when mapped onto the geometry imager coordinates (i.e. the coordinates of camera 1 202 of FIG. 2), as the texture/color coordinates u,v could also be combined into the single video frame (not shown; described in greater detail below). In this embodiment, the texture image sequence is compressed and transmitted separately, and the texture mapping is performed after decoding at the receiving side: the texture mapping coordinates are used to interpolate the texture image, providing texture information for the three-dimensional scene.

The compression standard H.264, for example, is a method for compressing a sequence of images and is well known in the art. This algorithm generally operates by exploiting the redundancy of information in time in order to achieve high compression rates. The single video frame shown in FIG. 3 could optionally be provided as a series of frames and the video data could then optionally be reconstructed from this series of frames.

Optionally, to support mapping and provision of the color data, the geometry data (and hence geometric image) described as a range (distance) function $r(i,j,t)$ could be provided as a video sequence, such that $r(i,j)$ would be a single frame in this case.

Figure 4:
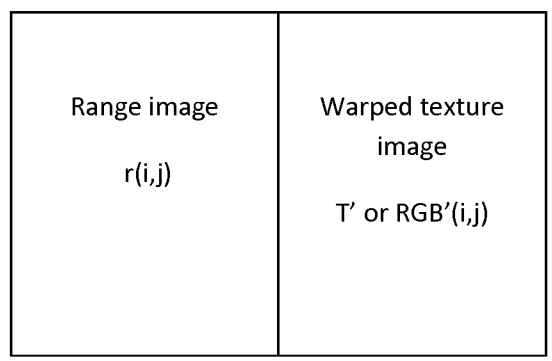
FIG. 4 shows an alternative, exemplary illustrative video frame in which the texture image data of the second camera (camera 2 202 of FIG. 2) is optionally pre-warped to the system of range image coordinates i,j.

Alternatively, instead of using the texture mapping coordinates, the texture image data of the second camera (camera 2 202 of FIG. 2) may optionally be pre-warped to the system of range image coordinates i,j as shown in FIG. 4. As shown, a single frame includes $r(i,j)$, as previously described, and warped texture image data $T'(i,j)$ or $RGB'(i,j)$.

In effect, the color (texture) image data could be virtually projected onto the geometric reconstructed structure, with translation of the color data from its image coordinates into the range coordinates, as if the image data had in fact been obtained from the low resolution, high frame rate geometry imager (camera 1 202 of FIG. 2) or vice-versa. Such translation would therefore permit the color image $RGB(u,v)$ to be transformed into $RGB(i,j)$.

Yet another non-limiting exemplary embodiment relates to embedding the geometry bit planes as part of a single image. That is, for a depth resolution of 16 bits per pixel, one could provide a single image in two parts, one part representing the most significant byte and the other part representing the least significant byte. Such a method would allow the captured geometry data to be combined with high depth resolution according to existing video-image compression technology.

Figure 5:
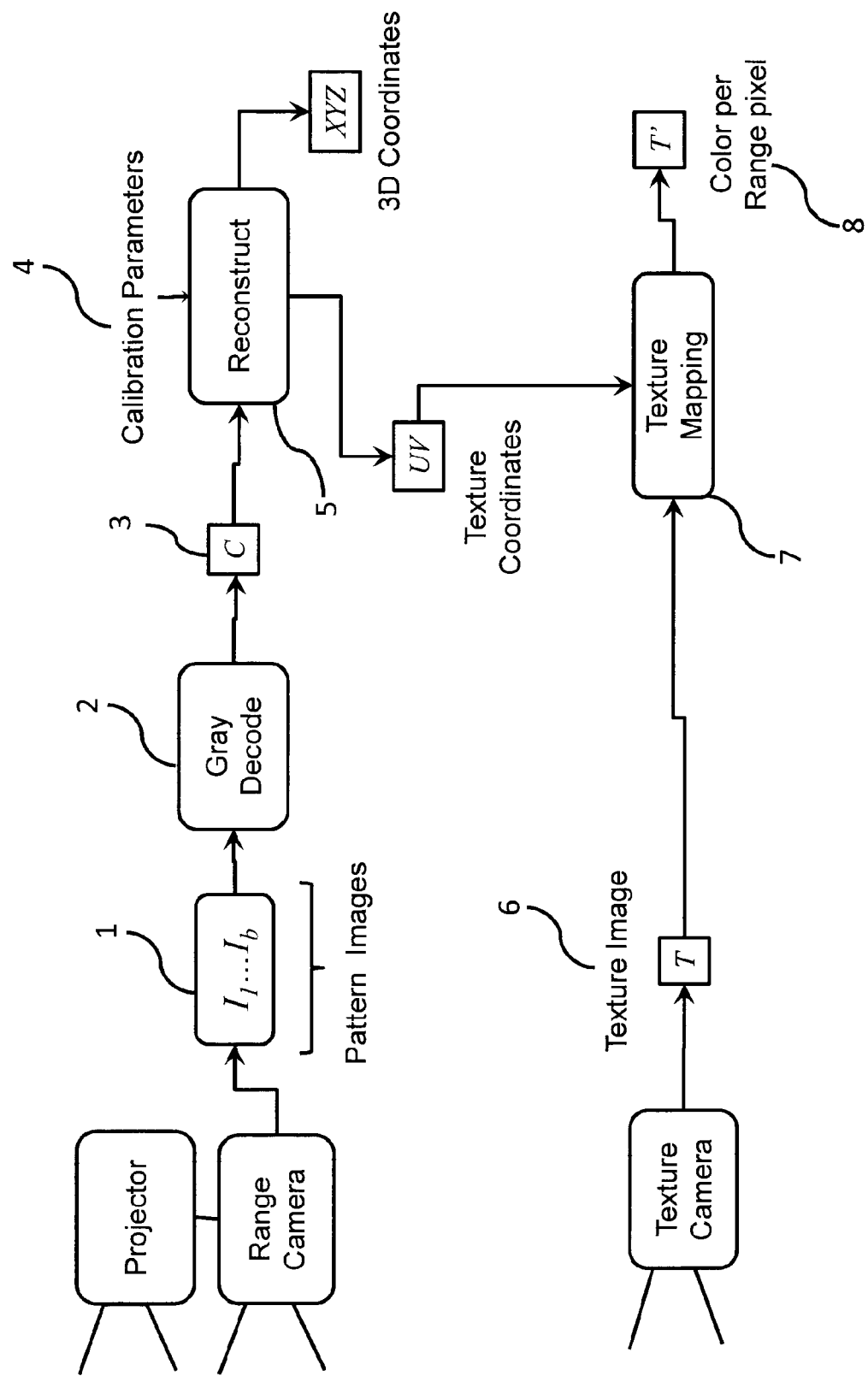
FIG. 5 shows an optional embodiment of the present invention for formation of 3D data without compression.
Figure 6:
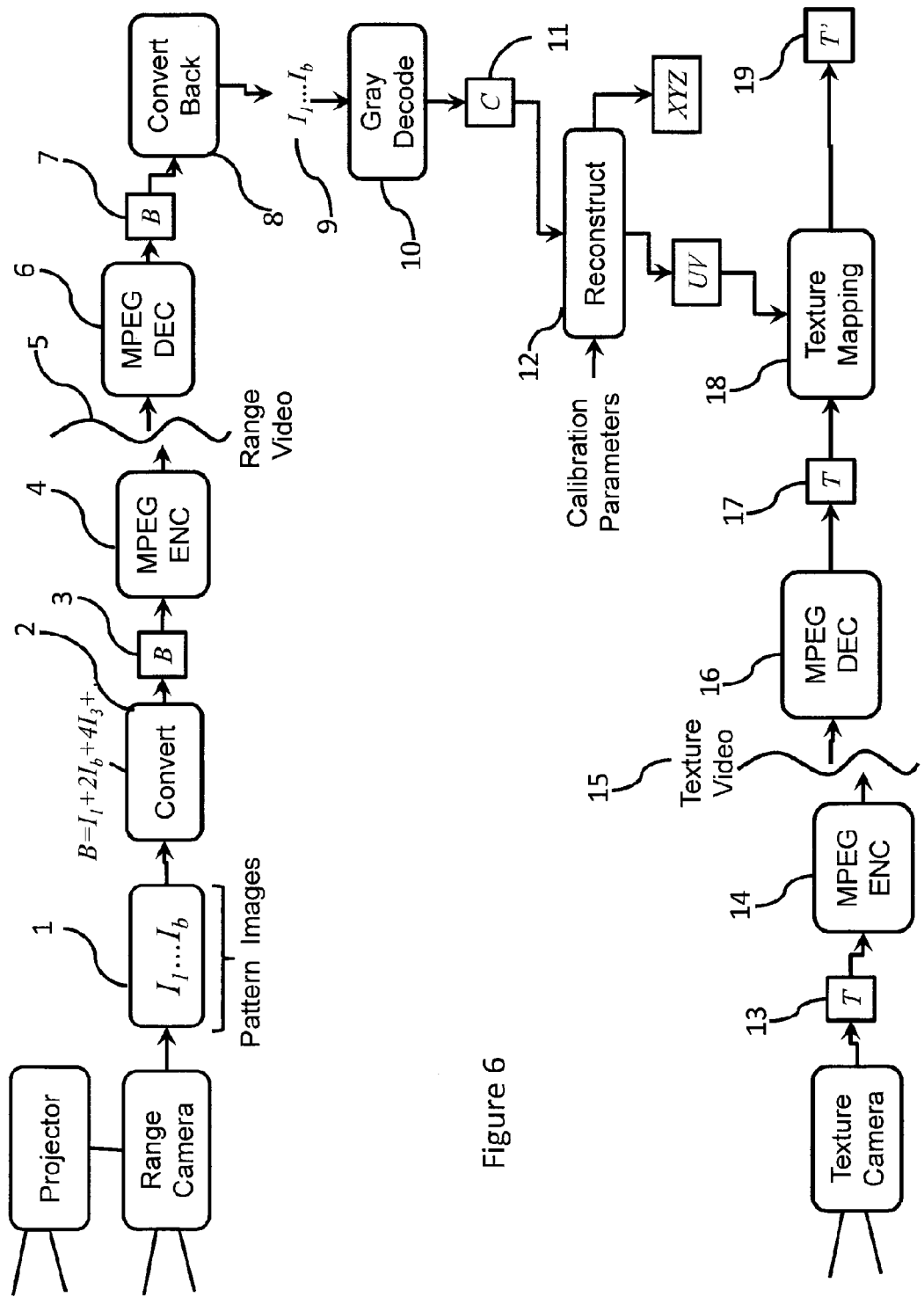
FIGS. 6 and 7 show optional embodiments of the present invention for compression of the above obtained data.
Figure 7:
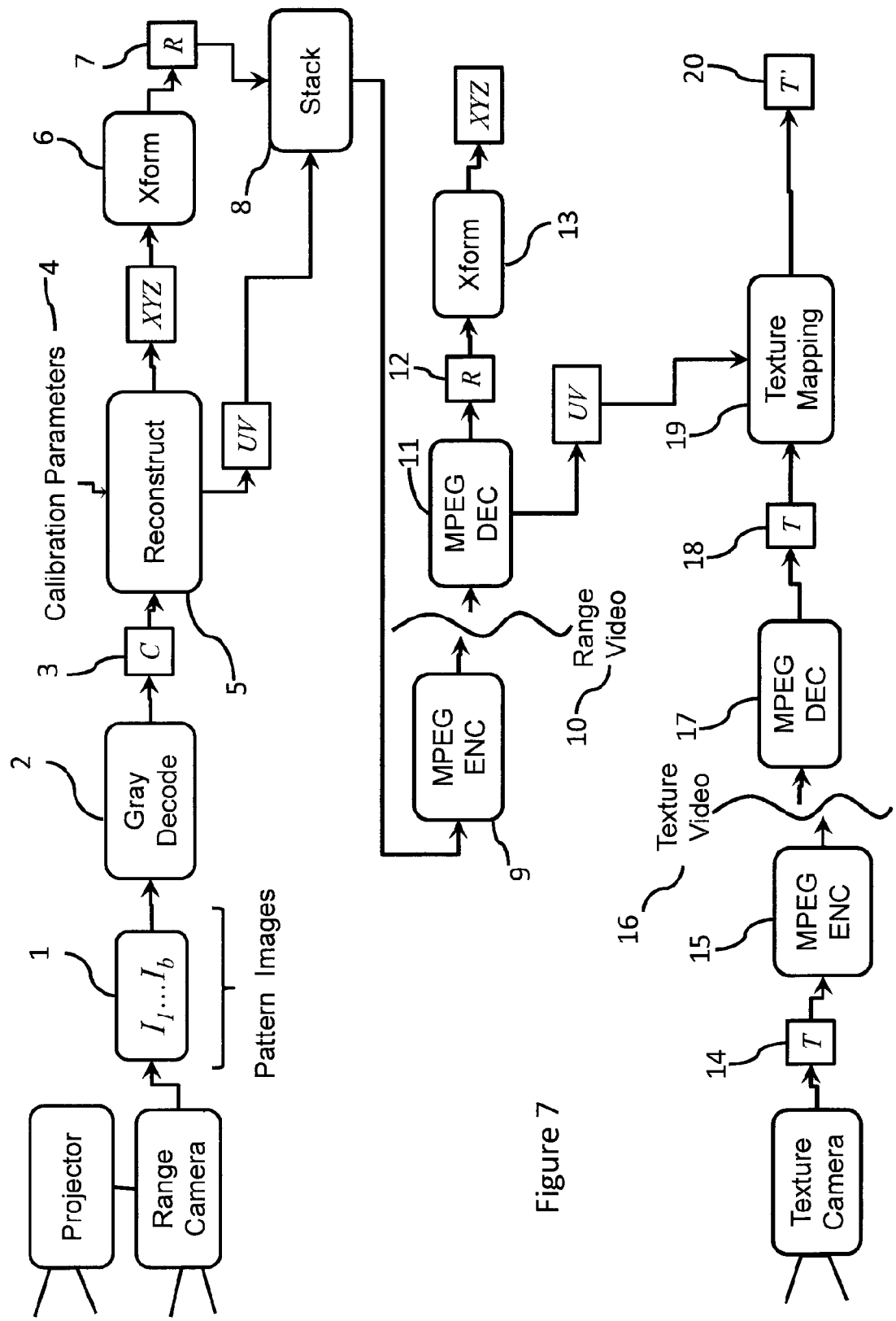

FIG. 5 shows an optional embodiment of the present invention for formation of 3D data without compression, while FIGS. 6 and 7 show optional embodiments of the present invention for compression of the above obtained data.

FIG. 5 shows a non-limiting exemplary method for the formation of 3D data (represented as textured point cloud) and features a plurality of stages.

As shown, initially in stage 1 the Range Camera captures a sequence b of coded images I1, . . . , Ib depicting the object illuminated by the Projector as described above. These images are bitplanes produced from data that has been converted to binary values, such that each pixel contains either 1 or 0 numeric values. Next, in stage 2, the process of obtaining the code in each pixel of the binary images is performed, producing a code image C in stage 3. For example a Gray decoder algorithm may optionally be applied to the coded images as is known in the art. The Gray code at each pixel corresponds to the specific way the space is coded by the projector of coded light. The application of the Gray decoder forms a Gray code image relating to the specific coding by the projector. The code, the pixel location on the camera, and the calibration parameters are used for reconstruction of the geometric structure of the observed scene as described below.

According to at least some embodiments, optionally the above raw data is represented as a geometric image, wherein in each pixel of the image, the three-dimensional coordinates of the pixel in space are stored. The geometric image can thus be considered as three arrays of the form $x(i,j)$, $y(i,j)$ and $z(i,j)$ where i,j are pixel indices and x,y,z are the three-dimensional coordinates.

Alternatively, the geometric image can be converted to a set of data related to the location of each pixel and the distance r distance from the camera origin (x0,y0,z0) to the object. In a simple conversion process, this conversion is done according to the formula $$r(i,j)=\text{sqrt}\{(x(i,j)-x0)^2+(y(i,j)-y0)^2+(z(i,j)-z0)^2\}.$$

Given calibration parameters, obtained from a calibration process in stage 4, the process of reconstructing 3D coordinates x,y,z plus texture mapping coordinates u,v in each pixel is performed in stage 5, again as previously described. The texture mapping coordinates are obtained through previous calibration, optionally performed at least once before the process starts, again as previously described. The texture mapping coordinates are required if the texture image is captured, a parallel but optional process as described below. The texture camera is calibrated with respect to the range camera used for three-dimensional data acquisition, such calibration providing for a mapping from the three-dimensional space coordinates x,y,z to the texture camera two-dimensional system of coordinates (u,v). As a result, for each pixel i,j in the range image it is possible to obtain the corresponding pixel i',j' in the texture image $T(u,v)$, which can be used for texture mapping.

Optionally, in a parallel process, in stage 6, the texture image T (or RGB in case of color camera) is captured by a Texture Camera, which may optionally have a different resolution from the range camera (which is the camera used for three-dimensional data acquisition). The texture image may also optionally be grayscale.

The u,v coordinates are used to map texture on the range image in stage 7, producing a new "warped" texture image T' (or optionally RGB') in stage 8, representing grayscale or color per pixel, again as previously described. The warped texture image T' is a non-limiting example of representative data that may optionally be generated from the three-dimensional coordinates of the object, the texture image and the coded light image according to correspondence between the two cameras. The combined image, optionally and preferably packed into a single frame as previously described, is then optionally transmitted and/or displayed on a display of any suitable type as is known in the art.

Texture mapping may optionally be performed according to the following simple process: for each range image pixel i,j (from the range camera), the texture coordinates u(i,j),v (i,j) are computed. These coordinates may be at sub-pixel precision, and the texture is computed by interpolating the value of T at the point u(i,j),v(i,j) from nearby pixels of T. This way, a texture image T'(i,j)=T(u(i,j),v(i,j)) in the range image coordinates is created and there is a one-to-one correspondence between a range pixel and its texture.

If the texture camera is in color, the color texture data may optionally be expressed as RGB(u,v) and interpolated to RGB'(i,j)=RGB(u(i,j),v(i,j)) according to such mapping.

While the above process results in an image featuring texture/color as previously described, it does not feature compression. Compression may optionally be performed in a number of different ways of which two non-limiting examples are described below in FIGS. 6 and 7. In the two non-limiting optional examples described below, one example (FIG. 7) relates to an "encoder heavy" process in which the significant computational processing is performed at the encoder, while the other example (FIG. 6) relates to a "decoder heavy" process in which the significant computational processing is performed at the decoder.

The encoder and decoder may optionally be inserted at various points in the above process of FIG. 5. The compression algorithm (encoder) may optionally be applied to data at various stages of above process, preceded by some pre-processing aiming to represent the data in such a way to render it more compressible by means of the compression algorithm, and the decompression algorithm (decoder) at the receiving side followed by some post-processing.

By varying the location of the encoder/decoder in the pipeline and appropriately selecting the pre-processing and post-processing methods, it is possible to achieve a tradeoff between the complexity of the encoding and decoding as well as the compression ratio of the data, according to the design and application requirements.

Both FIGS. 6 and 7 relate to video data and compression. Although the below description frequently specifically refers to video compression, it should be understood that compression of a single frame can be considered as a particular case thereof. Video compression algorithms attempt to reduce the video data size taking advantage of data redundancy in space and time. For examples, MPEG-type compression algorithms attempt to predict a current frame from temporally-close reference frame or frames (typically, previous frame), in the following way: the current frame is partitioned into small blocks (typically, 16×16 or 8×8 pixels, though the size can be varied adaptively in some compression algorithms). During the encoding process, the algorithm tries to displace the blocks according to some motion vector field (i.e., each block moves by a different amount from another block) in such a way that the frame warped in this manner (called motion-compensated frame) is as close as possible (in sense of some error criterion, e.g. sum of squared differences) to the reference frame. The resulting error image (difference between motion compensated and reference frame) is typically sparse and contains less information that the original frame. Frames encoded in this way are referred to as P-frames (predicted frames) in MPEG standard.

The error image is encoded as a standalone image, using JPEG-type compression. For this purpose, the error image is partitioned into blocks of fixed size; in each block, a two-dimensional Discrete Cosine Transform (DCT) is applied. The DCT transform coefficients are ordered in zig-zag scan from lowest to highest spatial frequency, quantized by a controllable amount, and encoded using typically some kind of arithmetic coding.

Some frames in the video sequences, typically at fixed intervals, are encoded as standalone images without motion compensation, using JPEG-type compression. Such frames are referred to as I-frames in MPEG standard.

The encoded stream includes encoded transform coefficients for I frames, and encoded transform coefficients+ motion vectors for P-frames.

At the decoding, the first I-frame is decoded first by JPEG-type decoder: the arithmetic code is decoded producing quantized transform coefficients in each image block; the coefficients are arranged back into spatial frequencies; inverse DCT transform is applied. Due to the use of quantization, the reconstructed image may be different from the original one, resulting in compression noise. P-frame decoding involves applying motion vectors to the reference frame, followed by decoding and adding the error image.

Various examples of MPEG standard compatible encoding and decoding algorithms are known in the art, such as those described (as an example and without any intention of being limiting) in U.S. Pat. No. 5,231,484 to Gonzales et al, issued on Jul. 27, 1993, which is hereby incorporated by reference as if fully set forth herein.

FIG. 6 shows an optional, exemplary method according to at least some embodiments of the present invention for providing compression with a "decoder-heavy" configuration, in which the encoder operates in the process after, and preferably immediately after, the acquisition of the pattern images in stage 1. For this purpose, in stage 2, the binary images I1, . . . , Ib are arranged so as to produce a single image B (in 8 or 16 bit precision, depending on the number of images b) in stage 3. The single image B (indicated as 3 in FIG. 6) acts as a frame in a video stream and is encoded by a compression algorithm in stage 4, which may for example optionally comprise any type of suitable encoding algorithm such as a standard MPEG compliant encoding algorithm for example. The encoded stream forms a range video stream and is transmitted to the client side in stage 6. At the client side, the stream is decoded in stage 7 by means of a suitable decompression algorithm, such as any suitable MPEG standard decoding algorithm (referred to as an MPEG standard compatible decoding algorithm), producing a sequence of frames, each of which contains an image B 7 (possibly corrupt by compression noise). The image B is again processed in stage 8 so as to be split into bitplanes I1, . . . , Ib in stage 9. In stage 10, the bitplanes undergo decoding as previously described, to produce a coded image in stage 11, also as previously described. Reconstruction to produce 3D coordinates x,y,z and texture mapping coordinates u,v is performed as described in stage 12.

In a parallel process, a texture image T is obtained as previously described in stage 13. This image is also encoded with a suitable encoding method, such as an MPEG standard encoding algorithm (referred to as an MPEG standard compatible encoding algorithm) in stage 14, to produce a texture video stream in stage 15. The texture video stream is transmitted to the client in stage 16, decoded as for image B in stage 17, and then mapped as previously described in stage 18. The mapped data is another example of representative data as previously described.

The two video streams, for 3D data and for texture data, need to be synchronized as is known in the art. For example, synchronization may optionally be performed according to internal mechanisms of standard codecs (encoder/decoder algorithms) such as those codecs used for synchronizing sound with image. Optionally and preferably standard codecs are applied to these data streams; also preferably the same or at least similar codec is used for both data streams, for greater ease of synchronization.

The results of stages 12 and 18 are then combined to obtain a complete, decompressed video stream.

FIG. 7 provides a different embodiment, with encoding and decoding both performing part of the necessary computations. In this non-limiting method, reconstruction of x,y,z and u,v occurs at the encoder side, and encoding is applied to reconstructed 3D coordinates and texture mapping coordinates. To decrease data size, x,y,z are represented as distance from origin as r, and stacked together with u,v, as shown in FIG. 3, to form "r form" data, which is another example of representative data. Texture images T are compressed and sent separately as a texture video stream as previously described.

Briefly, again in stage 1, the bitplane images are prepared from the range camera, which are then decoded in stage 2, as previously described in FIG. 5, to form a coded image in stage 3. In stage 4, calibration parameters are obtained, again according to the previously described calibration process. In stage 5, the process of reconstructing 3D coordinates x,y,z plus texture mapping coordinates u,v in each pixel is performed, again as previously described. The texture mapping coordinates are provided directly to the stack for use in stage 8. The x,y,z coordinates are preferably used to convert the image data to a range image R in stage 6, thereby forming the previously described set of data related to the location of each pixel and the distance r distance from the camera origin (x0,y0,z0) to the object in stage 7. In stage 8, stacking is performed as previously described, which packs the range image with the u,v parameterization maps that is then fed into an MPEG encoder.

In stage 8, the r form (range image R) data and the u,v coordinates are mapped to support texture mapping, thereby forming a stream of data in this coordinate form. In stage 9, the stream of data is encoded, for example according to MPEG standard algorithm, to form a range video stream in stage 10, which is then transmitted to the client side in stage 11. The data is then decoded according to an MPEG standard decoding algorithm in stage 12, with the r form data and the u,v coordinates being split. In stage 13, the r form data is converted back to x,y,z coordinates.

Again as previously described, a parallel texture video stream is obtained, starting with texture images in stage 14, which is synchronized with the 3D data stream as previously described. In stage 15, the texture images are encoded according to a suitable MPEG standard algorithm to form texture video stream in stage 16. The texture video stream is also transmitted to the client side in stage 17, and decoded by a suitable MPEG standard decoder in stage 18.

In stage 19, the u,v coordinates are used to map the texture data, such that in stage 20, the texture data is combined with the range camera data as previously described.

In a modification of the embodiment depicted in FIG. 7, the texture image is optionally additionally warped to the range image coordinate producing T'(i,j) at the encoder side. The geometric information represented as r(i,j) is stacked together with T'(i,j) as shown in FIG. 4 and encoded. Thus, the range and texture information may optionally represented in a single video stream.

Any of these optional embodiments, without wishing to be limited by a closed list, has the advantage of acquiring, storing, transmitting, and so forth, a reduced amount of data through a compression method that may optionally be implemented as a non-lossy method. The method is suitable for various types of camera configurations as described above, and can optionally even be implemented with high quality data and/or to ensure a high standard of data display, as described above. These embodiments of the present invention contrast with such three-dimensional data formats and methods such as 3D over MPEG, which is merely an extension of MPEG, although these embodiments may optionally employ standard MPEG algorithms as a tool as described above. Furthermore, these embodiments of the present invention are suitable for implementation with many different types of video compression methods and are not limited for use with a single method.

Also these embodiments of the present invention effectively align the video image data and the depth related data (ie—data which makes the image appear to be three dimensional), thereby enabling a "true" three-dimensional image to be displayed.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for acquiring three-dimensional data, comprising:
   projecting a plurality of time-multiplexed coded light patterns onto an object by a projector;
   receiving a coded light image by a first camera;
   obtaining code from the coded light image;
   reconstructing three-dimensional coordinates of the object from said code, wherein said reconstructing said three-dimensional coordinates comprises determining one or more calibration parameters for said first camera before receiving said coded light image;
   receiving texture image from a second camera;
   determining correspondence between the coordinates of the first and second cameras by reconstructing a distance r from origins of the first and second cameras to each pixel acquired by each camera, and using r to recover x, y and z world coordinates of each pixel; and
   generating representative data from the three-dimensional coordinates of the object, the texture image and the coded light image according to said correspondence by mapping said texture image onto said coded light image.

2. The method of claim 1, wherein said generating representative data further comprises converting the coded light image to range data according to said three-dimensional coordinates, converting the texture image to texture image data according to said correspondence and packing the texture image data and the range data into a single image.

3. The method of claim 2, further comprising displaying said single image as an image on a display.

4. The method of claim 3, performed for a plurality of images, further comprising forming a video stream of coded images and a video stream of texture images and synchronizing between said video streams.

5. The method of claim 4, further comprising encoding said video streams and transmitting encoded video streams.

6. The method of claim 5, further comprising receiving said video streams, decoding said video streams and displaying said video streams.

7. The method of claim 6, wherein said forming said video stream of coded images further comprises obtaining a plurality of coded light images; packing said coded light images as binary data into a single video frame; encoding said video frame; and transmitting said video frame.

8. The method of claim 7, wherein said forming said video stream of coded images further comprises obtaining a plurality of coded light images; converting said plurality of coded light images to r form data; and encoding said r form data.

9. The method of claim 8, further comprising transmitting said encoded r form data; receiving said encoded r form data; decoding said encoded r form data to obtain r form data; and converting said r form data to three dimensional coordinate image data.

10. The method of claim 5, wherein said encoding comprises compressing said data.

11. The method of claim 1, wherein said generating representative data further comprises converting reconstructed three-dimensional coordinates of the object into distance r from origin point at every pixel of the range image.

12. The method of claim 11, wherein said generating representative data includes warping the texture image captured by the second camera into the system of coordinates of the first camera.

13. The method of claim 12, wherein said generating representative data includes stacking range and texture data into a single image.

14. The method of claim 13, wherein said stacking comprises determining a distance r from origin point at every pixel of the range image and texture mapping coordinates.

15. A method for acquiring three-dimensional data in a video stream, comprising:
 projecting a plurality of time-multiplexed coded light patterns onto an object by a projector;
 receiving a plurality of coded light images by a first camera;
 obtaining codes from the coded light images;
 reconstructing three-dimensional coordinates of the object from said code, wherein said reconstructing said three-dimensional coordinates comprises determining one or more calibration parameters for said first camera before receiving said coded light images;
 receiving a plurality of texture images from a second camera;
 determining correspondence between the coordinates of the first and second cameras by reconstructing a distance r from origins of the first and second cameras to each pixel acquired by each camera, and using r to recover x, y and z world coordinates of each pixel;
 generating representative data from the three-dimensional coordinates of the object, the texture image and the coded light image according to said correspondence; and
 encoding said representative data to form an encoded video stream.

16. The method of claim 15, further comprising decoding said encoded video stream to form a decoded video stream; and displaying said decoded video stream.

17. The method of claim 15, wherein said generating said representative data comprises mapping said texture image onto said coded light image according to said correspondence.

18. The method of claim 15, wherein said generating said representative data comprises generating separate but synchronized video streams of texture images and coded light images; and encoding each video stream separately.

19. The method of claim 18, wherein said mapping said texture image onto said coded light image according to said correspondence is performed after each encoded video stream is decoded.

20. A method for acquiring three-dimensional data in a video stream, comprising:
 projecting a plurality of time-multiplexed coded light patterns onto an object by a projector;
 receiving a plurality of coded light images by a first camera; receiving a plurality of texture images from a second camera by reconstructing a distance r from origins of the first and second cameras to each pixel acquired by each camera, and using r to recover x, y and z world coordinates of each pixel;
 determining correspondence between the coordinates of the first and second cameras;
 generating separate but synchronized video streams of said texture images and of said coded light images; and
 encoding said video streams to form encoded video streams.

21. The method of claim 20, further comprising:
 decoding said encoded video streams to form decoded video streams;
 decomposing a video stream of coded light images to a plurality of coded light images;
 decomposing a video stream of texture images to a plurality of texture images;
 obtaining codes from the coded light images;
 reconstructing three-dimensional coordinates of the object from said code, wherein said reconstructing said three-dimensional coordinates comprises determining one or more calibration parameters for said first camera before receiving said coded light images; and
 generating representative data from the three-dimensional coordinates of the object, the texture image and the coded light image according to said correspondence by mapping said texture image onto said coded light image.

22. The method of claim 20, wherein said encoding is performed with an algorithm that is MPEG standard compatible and wherein said decoding is performed with an algorithm that is MPEG standard compatible.

* * * * *